(12) United States Patent
Li et al.

(10) Patent No.: US 11,367,215 B2
(45) Date of Patent: Jun. 21, 2022

(54) POSITIVE AZIMUTH TOWING GUIDANCE METHOD FOR ROAD RESCUE EQUIPMENT BASED ON LICENSE PLATE CORNER FEATURES

(71) Applicant: SOUTHEAST UNIVERSITY, Jiangsu (CN)

(72) Inventors: Xu Li, Jiangsu (CN); Jiwen Cao, Jiangsu (CN); Peizhou Ni, Jiangsu (CN); Kun Wei, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 65 days.

(21) Appl. No.: 17/057,915

(22) PCT Filed: May 29, 2019

(86) PCT No.: PCT/CN2019/089077
§ 371 (c)(1),
(2) Date: Nov. 23, 2020

(87) PCT Pub. No.: WO2020/034722
PCT Pub. Date: Feb. 20, 2020

(65) Prior Publication Data
US 2021/0312653 A1    Oct. 7, 2021

(30) Foreign Application Priority Data
Aug. 13, 2018   (CN) .......................... 201810920734.X (51) Int. Cl.
*G06T 7/70* (2017.01)
*G06T 7/73* (2017.01)
(Continued)

(52) U.S. Cl.
CPC .............. *G06T 7/73* (2017.01); *B60R 11/04* (2013.01); *B62D 15/029* (2013.01);
(Continued)

(58) Field of Classification Search
CPC . G06T 7/73; G06T 5/002; G06T 2207/10024; G06T 2207/30252;
(Continued)

(56) References Cited

U.S. PATENT DOCUMENTS

2014/0303849 A1* 10/2014 Hafner ................. B62D 13/06
701/1
2015/0345938 A1* 12/2015 Salter ................... H05B 47/105
356/138

(Continued)

FOREIGN PATENT DOCUMENTS

CN      103632550 A     3/2014
CN      106027997 A    10/2016
(Continued)

OTHER PUBLICATIONS

International Search Report (with English Translation) and Written Opinion dated Aug. 28, 2019 issued in corresponding International Application No. PCT/CN2019/089077.

*Primary Examiner* — Qian Yang
(74) *Attorney, Agent, or Firm* — Muncy, Geissler, Olds & Lowe, P.C.

(57) ABSTRACT

The present invention discloses a positive azimuth towing guidance method for road rescue equipment based on license plate corner features. The method combines a structure of the road rescue equipment and characteristics of a positive azimuth towing operation. First, an image of an operation area is collected by installing a camera, and grayscale processing and Gaussian smooth filtering are performed on the image; corner detection is performed on the smoothed grayscale image, and preference is implemented according to corner strengths; hierarchical clustering is performed on the preferred corners; an effective corner set of license plate characters is sorted out to implement license plate locating; and then towing guidance is implemented according to a (Continued)

license plate locating result, to improve the rescue efficiency of the road rescue equipment. The guidance method provided in the present invention has good real-time performance, environmental adaptability and anti-interference ability, thereby effectively improving the rescue efficiency of the road rescue equipment.

6 Claims, 4 Drawing Sheets (51) Int. Cl.
| | |
|---|---|
| B60R 11/04 | (2006.01) |
| B62D 15/02 | (2006.01) |
| G06K 9/62 | (2022.01) |
| G06T 5/00 | (2006.01) |
| G06V 10/25 | (2022.01) |
| B60R 11/00 | (2006.01) |
| G06V 20/62 | (2022.01) |
| G06V 30/10 | (2022.01) |

(52) U.S. Cl.
CPC ............ G06K 9/6218 (2013.01); G06T 5/002 (2013.01); G06V 10/25 (2022.01); *B60R 2011/008* (2013.01); *G06V 20/625* (2022.01); *G06V 30/10* (2022.01)

(58) Field of Classification Search
CPC ..................... G06T 7/0002; G06T 7/70; G06T 2207/10004; G06T 2207/20164; B60R 11/04; B60R 2011/008; B62D 15/029; G06K 9/6218; G06V 10/25; G06V 20/625; G06V 30/10; G06V 10/245; B60P 3/125
See application file for complete search history.

(56) References Cited

U.S. PATENT DOCUMENTS

| | | | | |
|---|---|---|---|---|
| 2016/0034771 | A1* | 2/2016 | Schamp | G06V 10/145 |
| | | | | 348/148 |
| 2016/0200359 | A1 | 7/2016 | Boeck et al. | |
| 2016/0375831 | A1* | 12/2016 | Wang | G06F 3/048 |
| | | | | 348/148 |
| 2016/0378118 | A1* | 12/2016 | Zeng | B60D 1/62 |
| | | | | 701/28 |
| 2019/0346858 | A1* | 11/2019 | Berkemeier | G05D 1/0225 |
| 2020/0062257 | A1* | 2/2020 | Berkemeier | B62D 15/029 |

FOREIGN PATENT DOCUMENTS

| | | |
|---|---|---|
| CN | 107861510 A | 3/2018 |
| CN | 109376734 A | 2/2019 |

\* cited by examiner

POSITIVE AZIMUTH TOWING GUIDANCE METHOD FOR ROAD RESCUE EQUIPMENT BASED ON LICENSE PLATE CORNER FEATURES

BACKGROUND

Technical Field

The present invention relates to the field of intelligent operations of road rescue equipment, and in particular, to a positive azimuth towing guidance method for road rescue equipment based on license plate corner features.

Related Art

With continuous growth of social economy, China's road transport infrastructure construction and automobile industry develop rapidly and the population of cars increases significantly. During traveling of a vehicle, special circumstances such as that the vehicle cannot travel normally due to improper driving or a failure of the vehicle grow increasingly. As an auto aftermarket, a road towing and rescuing industry is gradually valued by society and the public, and the importance of the road towing and rescuing industry in ensuring the safety and efficiency of road transport is increasingly prominent. However, since occurrence of traffic accidents is an objective necessity that cannot be completely prevented, after occurrence of many automobile traffic accidents, urban traffic jams or secondary chain accidents often occur due to untimely towing and rescuing or low rescue efficiency. For example, a traffic jam is caused because the road rescue equipment cannot quickly and accurately tow a vehicle in an accident away from the scene from a positive azimuth. Generally, positive azimuth rescue environments are relatively complex. Most of the environments are narrow and jammed, and the operation space is severely restricted. A to-be-towed vehicle is sandwiched between two vehicles on the left and right of the to-be-towed vehicle, and the three vehicles are arranged in parallel. In this case, the road rescue equipment can tow and rescue the to-be-towed vehicle only from the front of the to-be-towed vehicle.

A towing device of the road rescue equipment is mainly composed of a folding arm, a telescopic arm, a swing arm and bracket arms on two sides. During the implementation of the positive azimuth towing operation, the road rescue equipment is located in front of the front of the to-be-towed vehicle. First, the road rescue equipment aligns the bracket arms on the two sides respectively with two front wheels of the to-be-towed vehicle through a reversing operation, then fixes the two front wheels of the to-be-towed vehicle by locking tires, and finally pulls and lifts the to-be-towed vehicle and tows the to-be-towed vehicle away through the folding arm. However, conventionally, when the positive azimuth towing operation is performed, mainly in dependence on the experience of a driver, the position is corrected through a plurality of times of repeated reversing to implement the alignment between the bracket arms and the front wheels of the to-be-towed vehicle, to complete the towing operation. The current situation relies too much on the operating experience of an operator. In addition, a too long time is taken, and rescue efficiency is low.

To resolve the foregoing problems, the present invention provides a positive azimuth towing guidance method based on license plate corner features to assist the driver in implementing the towing operation, thereby improving the rescue efficiency of the road rescue equipment. Due to complexity and variability of the towing environments, the positive azimuth towing guidance method provided in the present invention not only should have good real-time performance, but also should have the ability to adapt to various types of vehicles and environment changes and the ability to resist various noises and interferences, which is also the premise of the reliability of the method.

SUMMARY

Purpose of the present invention: In view of the foregoing problems, the present invention provides a positive azimuth towing guidance method for road rescue equipment that not only has good real-time performance, but also has a relatively strong environmental adaptability and anti-interference ability.

Technical solution: To achieve the purpose of the present invention, the technical solution adopted by the present invention is: a positive azimuth towing guidance method for road rescue equipment based on license plate corner features, including the following steps:

(1) collecting an image of an operation area behind a wrecker and preprocessing the image;

(2) performing corner detection and preference on the preprocessed image;

(3) clustering preferred corners;

(4) locating a license plate according to the preferred corners and getting a license plate center; and (5) performing towing guidance according to the license plate center.

In step (1), an image collection and preprocessing method is as follows: installing a vehicle-mounted camera on a folding arm at the rear of the road rescue equipment to collect the image of the operation area behind the wrecker, first converting the color collected image into a grayscale image to reduce a volume of data of image processing, and performing smooth filtering on the grayscale image.

In step (2), corner detection is performed on the smoothed grayscale image by using a Harris corner detection algorithm to obtain the corners in the image and all the obtained corners are stored into a corner set O; preference is performed on the corners obtained by using the Harris corner detection to obtain a preferred corner set A, and the method is as follows:

(2.1) traversing all the corners in the corner set O in ascending order of horizontal and vertical coordinates of the corners, and saving, in a circular area that uses each corner as a center and that has a radius of 5 pixels, corners that have the largest corner strength in this area into the preferred corner set A; and (2.2) retaining, after the traversal ends, only one of the corners that are repeatedly saved and that have the same coordinates and corner strength in the preferred corner set A, and deleting redundant same corners from the preferred corner set A to finally obtain N different preferred corners.

In step (3), a corner clustering method is as follows: performing agglomerative hierarchical clustering on the preferred corner set A according to distances between the corners to obtain I preselected corner sets B of license plate characters, i=1, 2, 3, . . . , I, i representing a sequence number of a preselected corner set, the method being as follows:

(3.1) considering each corner $a_n$, n=1, 2, 3, . . . , N in the preferred corner set A as a class, there being only one corner in each class, calculating a class distance $D_{rg}$ between every two of all current classes, $D_{rg}$ representing the class distance between an $r^{th}$ class and a $g^{th}$ class, and defining the class distance $D_{rg}$ as an average value of a Euclidean distance between each corner in the $r^{th}$ class and each corner in the $g^{th}$ class, where since there is only one corner in each current class, that is, there is only a corner $a_r$ in the $r^{th}$ class, and there is only a corner $a_g$ in the $g^{th}$ class, a calculation formula of the class distance $D_{rg}$ is:

$$D_{rg} = d_{rg}$$

in this formula, $d_{rg}$ representing the Euclidean distance between corners $a_r$ and $a_g$, that is, $d_{rg} = \sqrt{(x_{a_r} - x_{a_g})^2 + (y_{a_r} - y_{a_g})^2}$, wherein $x_{a_r}$ and $y_{a_r}$ respectively represent horizontal and vertical coordinates of the corner $a_r$, and $x_{a_g}$ and $y_{a_g}$ respectively represent horizontal and vertical coordinates of the corner $a_g$; and according to the physical meaning of the class distance $D_{rg}$, $D_{rg} = D_{gr}$, and when $r = g$, $D_{rg} = 0$, all the class distances calculated above are expressed in a form of matrix, to obtain an initial N×N class distance matrix $$H = \begin{bmatrix} 0 & \cdots & D_{1N} \\ \vdots & \ddots & \vdots \\ D_{N1} & \cdots & 0 \end{bmatrix},$$

the element of row r and column g in the matrix H being $D_{rg}$;

(3.2) traversing the current Euclidean distance matrix H to find the minimum non-diagonal element in the matrix H, that is, the current smallest class distance being set as $D_{st}$, and $s \neq t$, indicating that an $s^{th}$ class and a $t^{th}$ class are the current two closest classes, where if $D_{st} < D_{th}$, the corner in the $t^{th}$ class is incorporated into the $s^{th}$ class, then the $s^{th}$ class and the $t^{th}$ class are merged into a new class, and a total quantity of classes of corners after merging is recorded as V, to perform sub-step (3.3); otherwise, the clustering calculation is ended to obtain the I preselected corner sets $B_i$ of license plate characters, $i = 1, 2, 3, \ldots, I$, wherein i represents a sequence number of a preselected corner set; I represents the total quantity of preselected corner sets of the license plate characters, and I = V, where in the determination condition of this sub-step, $D_{st}$ is the minimum non-diagonal element in the current matrix H; and $D_{th}$ is a minimum class distance threshold;

(3.3) recalculating a class distance $D_{rg}$ between every two of current remaining classes and new classes obtained through merging, in this case, a calculation formula of the class distance $D_{rg}$ being:

$$D_{rg} = \frac{\sum_{j=1}^{M_r} \sum_{k=1}^{M_g} d_{jk}}{M_r \times M_g}$$

in the formula, $M_r$ representing the quantity of corners in the $r^{th}$ class, the corners in the class being represented as $p_j$, $j = 1, 2, 3, \ldots, M_r$; $M_g$ representing the quantity of corners in the $g^{th}$ class, the corners in the class being represented as $q_k$, $k = 1, 2, 3, \ldots, M_g$; and $d_{jk}$ representing a Euclidean distance between corners $p_j$ and $q_k$, that is, $d_{jk} = \sqrt{(x_{p_j} - x_{q_k})^2 + (y_{p_j} - y_{q_k})^2}$, wherein $x_{p_j}$ and $y_{p_j}$ respectively represent horizontal and vertical coordinates of the corner $p_j$, and $x_{q_k}$ and $y_{q_k}$ respectively represent horizontal and vertical coordinates of the corner $q_k$; and updating, by using the recalculated class distance, the class distance matrix H according to the class distance $D_{rg}$ and the physical meaning of the class distance matrix H, to obtain a new V×V class distance matrix H=

$$H = \begin{bmatrix} 0 & \cdots & D_{1V} \\ \vdots & \ddots & \vdots \\ D_{V1} & \cdots & 0 \end{bmatrix},$$

and returning to sub-step (3.2).

In step (4), a license plate locating method is as follows: for the preselected corner set $B_i$ of the license plate characters obtained by clustering in step (3), $i = 1, 2, 3 \ldots, I$, sorting out an effective corner set C of the license plate characters from the preselected corner set $B_i$ of the license plate characters, and then determining a license plate position, the method being as follows:

(4.1) initializing $i = 1$;

(4.2) if the preselected corner set $B_i$ of the license plate characters satisfies that $num_{B_i} > num_{th}$, performing sub-step (4.3); otherwise, performing sub-step (4.5), wherein in the determination condition of this sub-step, $num_{B_i}$ is the quantity of corners in the corner set $B_i$ of the license plate characters; and $num_{th}$ is a threshold of the quantity of corners in the corner set of the license plate characters;

(4.3) traversing the preselected corner set $B_i$ of the license plate characters to determine a maximum horizontal coordinate $\overline{x}_{B_i}$, a minimum horizontal coordinate $\underline{x}_{B_i}$, a maximum vertical coordinate $\overline{y}_{B_i}$, and a minimum vertical coordinate $\underline{y}_{B_i}$ of corners in the set, and define a center $(x_{B_i}, y_{B_i})$, a length $l_{B_i}$, and a width $w_{B_i}$ of a minimum enclosing rectangle of the corner set, that is, $x_{B_i} = \frac{1}{2}(\underline{x}_{B_i} + \overline{x}_{B_i})$, $y_{B_i} = \frac{1}{2}(\underline{y}_{B_i} + \overline{y}_{B_i})$, $l_{B_i} = \overline{x}_{B_i} - \underline{x}_{B_i}$, and $w_{B_i} = \overline{y}_{B_i} - \underline{y}_{B_i}$, and then calculating an aspect ratio $\beta_{B_i}$ and an area $\gamma_{B_i}$ of the minimum enclosing rectangle of the preselected corner set $B_i$ of the license plate characters, that is, $\beta_{B_i} = l_{B_i}/w_{B_i}$ and $\gamma_{B_i} = l_{B_i} \times w_{B_i}$, if $\beta_{B_i} > \beta_{min}$ and $\beta_{B_i} < \beta_{max}$, the sub-step (4.4) being performed; otherwise, the sub-step (4.5) being performed, where in the determination condition of this sub-step, $\beta_{B_i}$ represents the aspect ratio of the minimum enclosing rectangle of the preselected corner set $B_i$ of the license plate characters; $\beta_{min}$ represents a low threshold of the aspect ratio of the minimum enclosing rectangle of the preselected corner set $B_i$ of the license plate characters; and $\beta_{max}$ represents a high threshold of the aspect ratio of the minimum enclosing rectangle of the preselected corner set $B_i$ of the license plate characters;

(4.4) if the preselected corner set $B_i$ of the license plate characters satisfies that $\gamma_{B_i} > \gamma_{min}$ and $\gamma_{B_i} < \gamma_{max}$, determining the corner set $B_i$ as the effective corner set C of the license plate characters, and determining a license plate center $(x_0, y_0)$, a length $l_0$, and a width $w_0$, that is, $x_0 = x_{B_i}$, $y_0 = y_{B_i}$, $l_0 = l_{B_i}$, and $w_0 = w_{B_i}$, ending the license plate locating process, and performing (5) to implement the towing guidance; otherwise, performing sub-step (4.5), where in the determination condition of this sub-step, $\gamma_{B_i}$ represents an area of the minimum enclosing rectangle of the preselected corner set $B_i$ of the license plate characters; $\gamma_{min}$ represents a low threshold of the area of the minimum enclosing rectangle of the preselected corner set $B_i$ of the license plate characters; and $\gamma_{max}$ represents a high threshold of the area of the minimum enclosing rectangle of the preselected corner set $B_i$ of the license plate characters; and (4.5) if $i < I$, increasing the value of i by 1, and returning to sub-step (4.2); otherwise ending the license plate locating process, and returning to image collection and preprocessing in step (1).

In step (5), the towing guidance method is implemented as follows: giving, according to a position of the license plate center $(x_0, y_0)$ in the image determined during the license plate locating in step (4), a direction prompt in real time to guide the driver to perform a reversing operation: if the license plate center of the to-be-towed vehicle in the image is on the left side of the center of the image, the driver is prompted to reverse to the right; and if the license plate center of the to-be-towed vehicle in the image is on the right side of the center of the image, the driver is prompted to reverse to the left, to implement alignment between bracket arms on two sides and two front wheels of the to-be-towed vehicle, and then fix the to-be-towed vehicle by locking tires and tow the to-be-towed vehicle away.

Beneficial effects: Compared with the existing technology, the technical solution of the present invention has the following beneficial technical effects:

1. The technical solution is provided based on a structure of road rescue equipment and working characteristics of a positive azimuth towing operation, which can effectively speed up positive azimuth wheel towing and alignment, form a guidance aid for the towing operation, and improve the rescue efficiency of the road rescue equipment.

2. The guidance reliability is high, the anti-interference ability is strong, and the environmental adaptability is good. The guidance method provided in the present invention fully considers and utilizes character corner features shared by different vehicles on license plates, and can adapt to various different types of vehicles.

3. The processing speed is high and the real-time performance is good. The guidance method provided in the present invention adopts a grayscale image for corner detection, and performs corner preference before corner clustering, which effectively improves the operation speed of the guidance method and ensures the real-time performance.

DETAILED DESCRIPTION

The technical solution of the present invention is further described below with reference to the accompanying drawings and embodiments.

Figure 2:
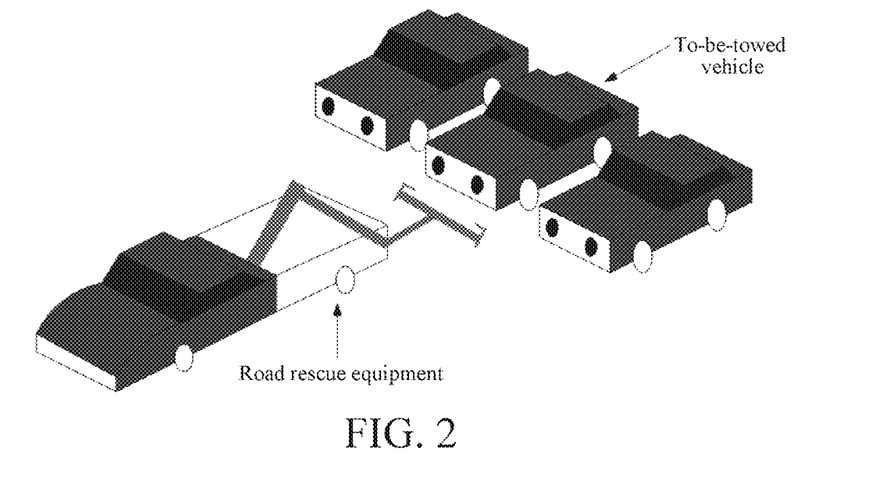
FIG. 2 is a schematic three-dimensional diagram of a positive azimuth towing operation for road rescue equipment.
Figure 3:
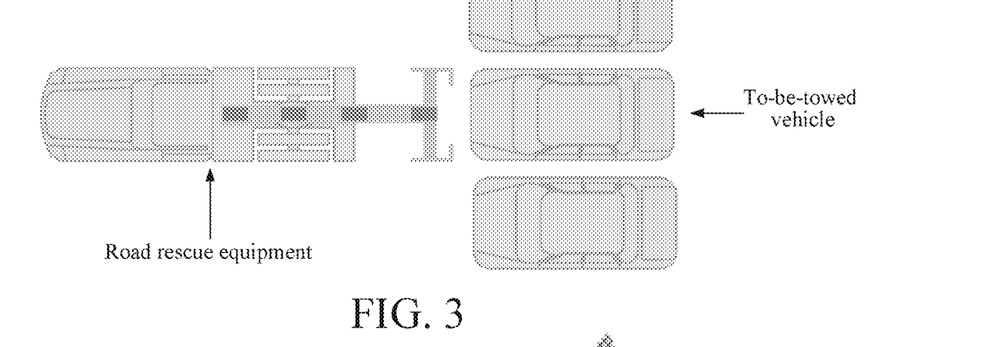
FIG. 3 is a top view of a positive azimuth towing operation for road rescue equipment.

With continuous growth of social economy, China's road transport infrastructure construction and automobile industry develop rapidly and the population of cars increases significantly. During traveling of a vehicle, special circumstances such as that the vehicle cannot travel normally due to improper driving or a failure of the vehicle grow increasingly. As an auto aftermarket, a road towing and rescuing industry is gradually valued by society and the public, and the importance of the road towing and rescuing industry in ensuring the safety and efficiency of road transport is increasingly prominent. However, since occurrence of traffic accidents is an objective necessity that cannot be completely prevented, after occurrence of many traffic accidents, urban traffic jams or secondary chain accidents often occur due to untimely towing and rescuing or low rescue efficiency. For example, a traffic jam is caused because the road rescue equipment cannot quickly and accurately tow a vehicle in an accident away from the scene from a positive azimuth. The reason is that, on the one hand, positive azimuth rescue environments are relatively complex. Most of the environments are narrow and jammed, and the operation space is severely restricted. As shown in FIG. 2 and FIG. 3 in the specification, a to-be-towed vehicle is sandwiched between two vehicles on the left and right of the to-be-towed vehicle, and the three vehicles are arranged in parallel. In this case, the road rescue equipment can tow and rescue the to-be-towed vehicle only from the front of the to-be-towed vehicle. On the other hand, the road rescue equipment has a low level of intelligence, and does not use an existing scientific and technical mean to guide and assist the towing operation, which is an important factor in leading to low rescue efficiency. However, there is currently no research on the technology related to positive azimuth towing guidance for the road rescue equipment.

Figure 4:
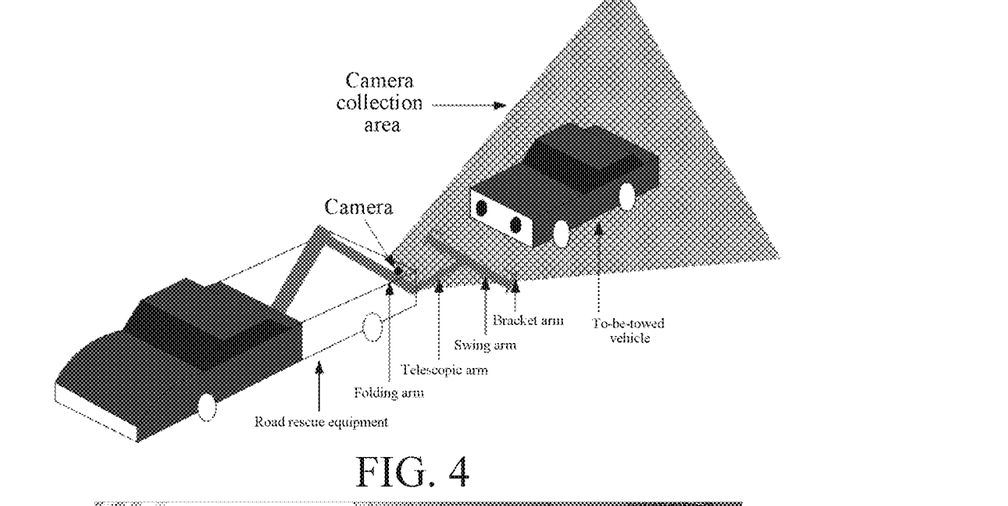
FIG. 4 is a schematic diagram of a structure of a towing device of road rescue equipment and an installation position of a camera.

Using a rescue pickup as an example, a towing device of the road rescue equipment is mainly composed of a folding arm, a telescopic arm, a swing arm and bracket arms on two sides. A specific form is shown in FIG. 4. During the implementation of the positive azimuth towing operation, the road rescue equipment is located in front of the front of the to-be-towed vehicle. First, the road rescue equipment aligns the bracket arms on the two sides respectively with two front wheels of the to-be-towed vehicle through a reversing operation, then fixes the two front wheels of the to-be-towed vehicle by locking tires, and finally pulls and lifts the to-be-towed vehicle through the folding arm and tows the to-be-towed vehicle away. During the conventional positive azimuth towing operation, the efficiency of the operation of aligning the front wheels of the to-be-towed vehicle with the bracket arms of the road rescue equipment mainly depends on technical experience of a driver and other human factors. A plurality of times of repeated reversing are required for position correction. As a result, a too long time is taken for the operation and rescue efficiency is low.

Figure 1:
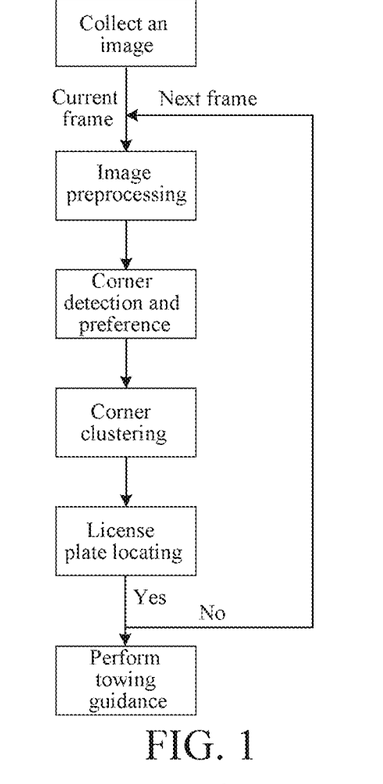
FIG. 1 is a flowchart of a positive azimuth towing guidance method for road rescue equipment according to the present invention.

In view of characters of the positive azimuth towing operation of the road rescue equipment, the present invention provides a positive azimuth towing guidance method for road rescue equipment that not only has good real-time performance, but also has a relatively strong environmental adaptability and anti-interference ability. For a general process, refer to FIG. 1 in the specification, and the method mainly includes the following steps:

(1) Image Collection and Preprocessing

Figure 5:
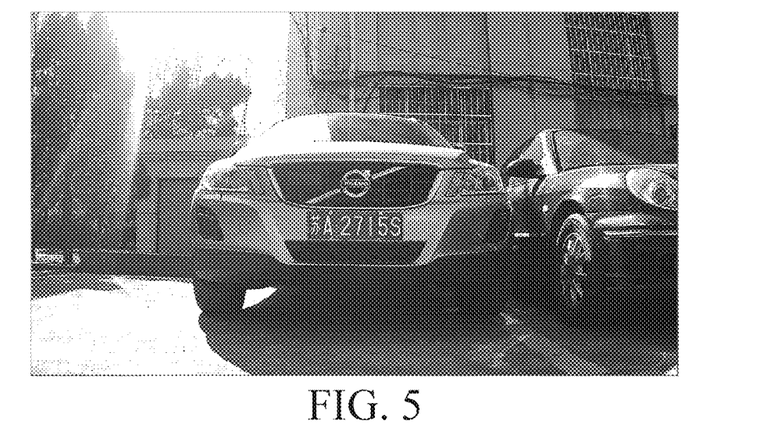
FIG. 5 is a frame of image that is collected.
Figure 6:
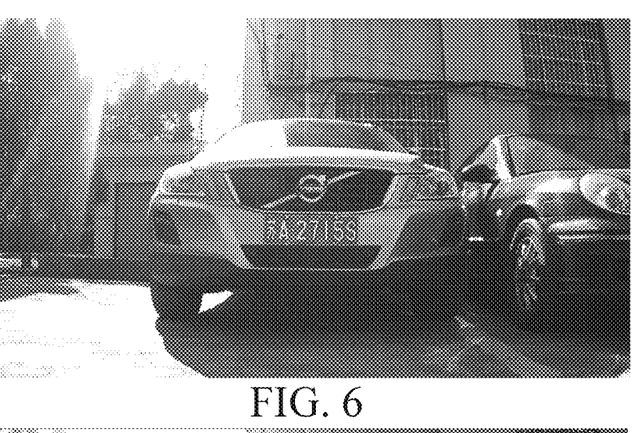
FIG. 6 is a diagram of a preprocessing result of a collected image.

A vehicle-mounted camera is installed at a middle position, that is 40 to 60 centimeters away from the ground, on the folding arm at the rear of the road rescue equipment. The camera horizontally faces the rear of the rescue equipment, and a collection range of the camera includes the swing arm and the bracket arms of the rescue equipment and rear operation areas of the front of the to-be-towed vehicle and some key parts. A specific form is shown in FIG. 4 in the specification. A collected image of a rear operation area, referring to FIG. 5 in the specification, is preprocessed, referring to FIG. 6 in the specification. First, a color collected image is converted into a grayscale image to reduce a volume of data of image processing to improve the real-time performance of the method. Then 3×3 neighborhood Gaussian smooth filtering is performed on the grayscale image to eliminate some unnecessary isolated points and bumps.

(2) Corner Detection and Preference

It should be noted that, currently, most social vehicles in China are sedan cars with blue license plates. The guidance method provided in the present invention is mainly oriented to towing and rescuing of sedan cars with blue license plates. The license plate is a common feature of most social vehicles and is universal. License plate characters are printed characters, and character strokes contain rich corner information, so that corner features of a license plate area may be extracted through corner detection.

Typical corner detection methods include the Moravec corner detection algorithm, the Susan corner detection algorithm, the Fast corner detection algorithm, the Harris corner detection algorithm, and the like. The Moravec corner detection algorithm is simple, but the calculation amount is large and the false detection rate is high. The Susan corner detection algorithm is not sensitive to noise, but the locating accuracy is poor. The Harris corner detection algorithm is simple, the calculation amount is not large, the corner extraction is relatively uniform, the adaptability is strong, and the stability is good. In the present invention, the smoothed grayscale image is detected by using the Harris corner detection algorithm to obtain the corners in the image, referring to FIG. 7 in the specification, and all the obtained corners are stored into a corner set O.

Figure 7:
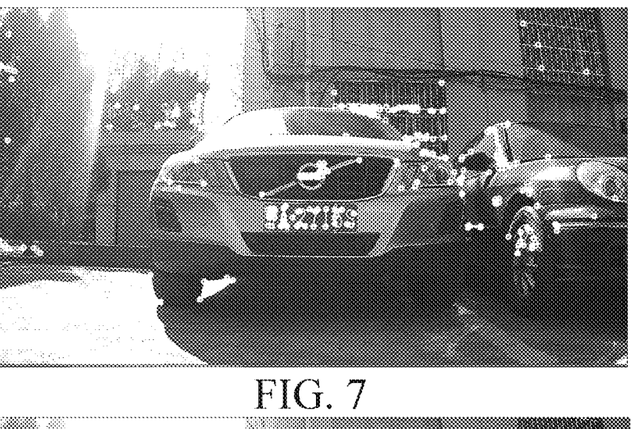
FIG. 7 is a diagram of a corner detection result of a collected image.
Figure 8:
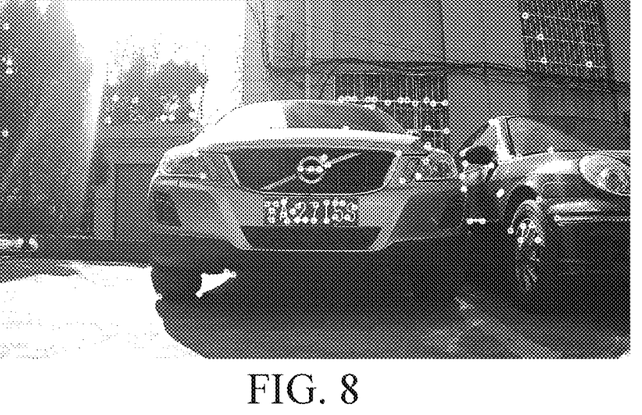
FIG. 8 is a diagram of a corner preference result of a collected image.

The position of the Harris corner detection is relatively accurate, and the corner extraction is relatively uniform, but most of the obtained corner positions appear in batches in a form of neighborhood, referring to FIG. 7 in the specification. To further reduce the calculation amount during the subsequent corner clustering and improve the real-time performance of the guidance method, the corners obtained by using the foregoing Harris corner detection may be preferred according to corner strengths, to obtain corner positions that are more representative. The effective operation distance of the positive azimuth towing operation is generally 1 to 5 meters, and the selected focal length of the camera is 4 to 8 millimeters. A size of the image collected by the camera in the present invention is 960×540, and the minimum allowable distance between the corners may be set to 5 pixels. The corners obtained by using the Harris corner detection are preferred to obtain a preferred corner set A, referring to FIG. 8 in the specification, and specific sub-steps are:

(2.1) traversing all the corners in the corner set O in ascending order of horizontal and vertical coordinates of the corners, and saving, in a circular area that uses each corner as a center and that has a radius of 5 pixels, corners that have the largest corner strength in this area into the preferred corner set A; and (2.2) retaining, after the traversal ends, only one of the corners that are repeatedly saved and that have the same coordinates and corner strength in the preferred corner set A, and deleting redundant same corners from the preferred corner set A to finally obtain N different preferred corners.

(3) Corner Clustering

Figure 9:
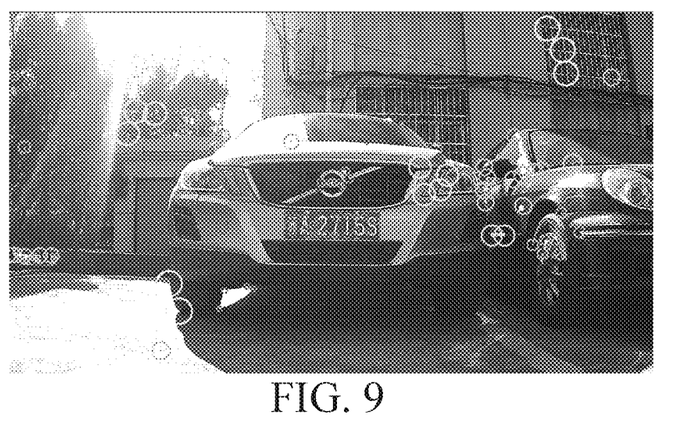
FIG. 9 is a diagram of a corner clustering result of a collected image.

The corners of the characters in the license plate area are distributed densely and regularly. Agglomerative hierarchical clustering may be performed on the preferred corner set A according to distances between the corners, referring to FIG. 9 in the specification, to obtain I preselected corner sets $B_i$ of license plate characters, i=1, 2, 3, . . . , I, i representing a sequence number of a preselected corner set, the specific sub-steps being as follows:

(3.1) considering each corner $a_n$, n=1, 2, 3, . . . , N in the preferred corner set A as a class, there being only one corner in each class, calculating a class distance $D_{rg}$ between every two of all current classes, $D_{rg}$ representing the class distance between an $r^{th}$ class and a $g^{th}$ class, and defining the class distance $D_{rg}$ as an average value of a Euclidean distance between each corner in the $r^{th}$ class and each corner in the $g^{th}$ class in the present invention, where since there is only one corner in each current class, that is, there is only a corner $a_r$ in the $r^{th}$ class, and there is only a corner $a_g$ in the $g^{th}$ class, a calculation formula of the class distance $D_{rg}$ is:

$$D_{rg}=d_{rg}$$

in this formula, $d_{rg}$ representing the Euclidean distance between corners $a_r$ and $a_g$, that is, $d_{rg}=\sqrt{(x_{a_r}-x_{a_g})^2+(y_{a_r}-y_{a_g})^2}$, where $x_{a_r}$ and $y_{a_r}$ respectively represent horizontal and vertical coordinates of the corner $a_r$, and $x_{a_g}$ and $y_{a_g}$ respectively represent horizontal and vertical coordinates of the corner $a_g$; and according to the physical meaning of the class distance $D_{rg}$, $D_{rg}=D_{gr}$, and when r=g, $D_{rg}=0$, all the class distances calculated above are expressed in a form of matrix, to obtain an initial N×N class distance matrix $$H = \begin{bmatrix} 0 & \cdots & D_{1N} \\ \vdots & \ddots & \vdots \\ D_{N1} & \cdots & 0 \end{bmatrix},$$

the element of row r and column g in the matrix H being $D_{rg}$;

(3.2) traversing the current Euclidean distance matrix H to find the minimum non-diagonal element in the matrix H, that is, the current smallest class distance being set as $D_{st}$, and s≠t, indicating that an $s^{th}$ class and a $t^{th}$ class are the current two closest classes, where if $D_{st}<D_{th}$, the corner in the $t^{th}$ class is incorporated into the $s^{th}$ class, then the $s^{th}$ class and the $t^{th}$ class are merged into a new class, and a total quantity of classes of corners after merging is recorded as V, to perform sub-step (3.3); otherwise, the clustering calculation is ended to obtain the I preselected corner sets $B_i$ of license plate characters, i=1, 2, 3 . . . , I, where i represents a sequence number of a preselected corner set; I represents the total quantity of preselected corner sets of the license plate characters, and I=V, where in the determination condition of this sub-step, $D_{st}$ is the minimum non-diagonal element in the current matrix H; and $D_{th}$ is a minimum class distance threshold, the threshold being within 10 to 15;

(3.3) recalculating a class distance $D_{rg}$ between every two of current remaining classes and new classes obtained through merging, in this case, a calculation formula of the class distance $D_{rg}$ being:

$$D_{rg} = \frac{\sum_{j=1}^{M_r} \sum_{k=1}^{M_g} d_{jk}}{M_r \times M_g}$$

in the formula, $M_r$ representing the quantity of corners in the $r^{th}$ class, the corners in the class being represented as $p_j$, j=1, 2, 3, . . . , $M_r$; $M_g$ representing the quantity of corners in the $g^{th}$ class, the corners in the class being represented as $q_k$, k=1, 2, 3, . . . , $M_g$; and $d^{jk}$ representing a Euclidean distance between corners $p_j$ and $q_k$, that is, $d_{jk} = \sqrt{(x_{p_j}-x_{q_k})^2 + (y_{p_j}-y_{q_k})^2}$, where $x_{p_j}$ and $y_{p_j}$ respectively represent horizontal and vertical coordinates of the corner $p_j$, and $x_{q_k}$ and $y_{q_k}$ respectively represent horizontal and vertical coordinates of the corner $q_k$; and updating, by using the recalculated class distance, the class distance matrix H according to the class distance $D_{rg}$ and the physical meaning of the class distance matrix H, to obtain a new V×V class distance matrix $$H = \begin{bmatrix} 0 & \cdots & D_{1V} \\ \vdots & \ddots & \vdots \\ D_{V1} & \cdots & 0 \end{bmatrix},$$

and returning to sub-step (3.2).

(4) License Plate Locating

Figure 10:
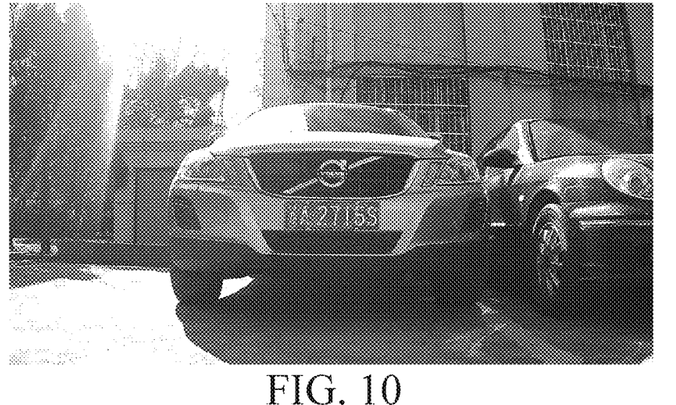
FIG. 10 is a diagram of a sorting result of effective corners of license plate characters of a collected image.
Figure 11:
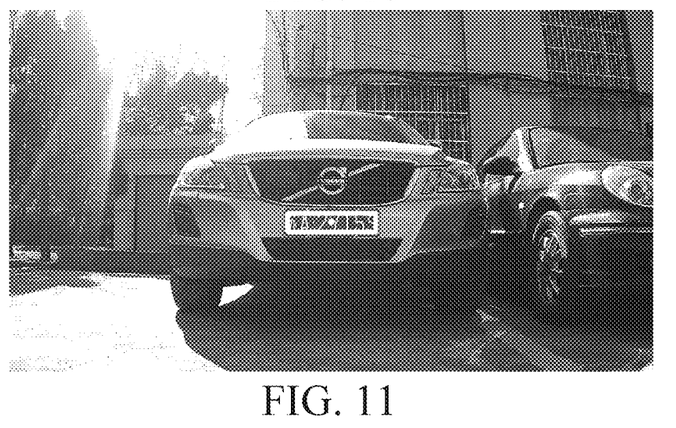
FIG. 11 is a diagram of a license plate locating result.

For the preselected corner set $B_i$ of the license plate characters obtained by clustering in step (3), i=1, 2, 3 . . . , I, according to a priori knowledge of the size of the license plate, an effective corner set C of the license plate characters is sorted out from the preselected corner set of the license plate characters, referring to FIG. 10 in the specification, and then a license plate position is determined, referring to FIG. 11 in the specification. Specific sub-steps are as follows:

(4.1) initializing i=1;

(4.2) if the preselected corner set IL of the license plate characters satisfies that $num_{B_i} > num_{th}$, performing sub-step (4.3); otherwise, performing sub-step (4.5), where in the determination condition of this sub-step, and $num_{th}$ is a threshold of the quantity of corners in the corner set $B_i$ of the license plate characters; and $num_{th}$ is a threshold of the quantity of corners in the corner set of the license plate characters, the threshold being within 6 to 8;

(4.3) traversing the preselected corner set $B_i$ of the license plate characters to determine a maximum horizontal coordinate $\overline{x}_{B_i}$, a minimum horizontal coordinate $\underline{x}_{B_i}$, a maximum vertical coordinate $\overline{y}_{B_i}$, and a minimum vertical coordinate $\underline{y}_{B_i}$ of corners in the set, and define a center $(x_{B_i}, y_{B_i})$, a length $l_{B_i}$, and a width $w_{B_i}$ of a minimum enclosing rectangle of the corner set, that is, $x_{B_i} = \frac{1}{2}(\overline{x}_{B_i} + \underline{x}_{B_i})$, $y_{B_i} = \frac{1}{2}(\overline{y}_{B_i} + \underline{y}_{B_i})$, $l_{B_i} = \overline{x}_{B_i} - \underline{x}_{B_i}$, and $w_{B_i} = \overline{y}_{B_i} - \underline{y}_{B_i}$, and then calculating an aspect ration $\beta_{B_i}$ and an area $\gamma_{B_i}$ of the minimum enclosing rectangle of the preselected corner set B of the license plate characters, that is, $\beta_{B_i} = l_{B_i}/w_{B_i}$ and $\gamma_{B_i} = l_{B_i} \times w_{B_i}$; if $\beta_{B_i} > \beta_{min}$ and $\beta_{B_i} < \beta_{max}$, the sub-step (4.4) being performed; otherwise, the sub-step (4.5) being performed, where in the determination condition of this sub-step, $\beta_{B_i}$ represents the aspect ratio of the minimum enclosing rectangle of the preselected corner set $B_i$ of the license plate characters; $\beta_{min}$ represents a low threshold of the aspect ratio of the minimum enclosing rectangle of the preselected corner set $B_i$ of the license plate characters, the threshold being within 3 to 3.5; and $\beta_{max}$ represents a high threshold of the aspect ratio of the minimum enclosing rectangle of the preselected corner set $B_i$ of the license plate characters, the threshold being within 4.5 to 5;

(4.4) if the preselected corner set $B_i$ of the license plate characters satisfies that $\gamma_{B_i} > \gamma_{min}$ and $\gamma_{B_i} > \gamma_{max}$, determining the corner set $B_i$ as the effective corner set C of the license plate characters, and determining a license plate center $(x_0, y_0)$, a length $l_0$, and a width $w_0$, that is, $x_0 = x_{B_i}$, $y_0 = y_{B_i}$, $l_0 = l_{B_i}$, and $w_0 = w_{B_i}$, ending the license plate locating process, and performing (5) to implement the towing guidance; otherwise, performing sub-step (4.5), where in the determination condition of this sub-step, $\gamma_{B_i}$ represents an area of the minimum enclosing rectangle of the preselected corner set $B_i$ of the license plate characters; $\gamma_{min}$ represents a low threshold of the area of the minimum enclosing rectangle of the preselected corner set $B_i$ of the license plate characters, the threshold being within 200 to 300; and $\gamma_{max}$ represents a high threshold of the area of the minimum enclosing rectangle of the preselected corner set $B_i$ of the license plate characters, the threshold being within 5000 to 5500; and (4.5) if i<I, increasing the value of i by 1, and returning to sub-step (4.2); otherwise ending the license plate locating process, and returning to image collection and preprocessing in step (1).

Two supplementary explanations for the foregoing algorithm of sorting out the effective corner set of the license plate characters are: ① Blue license plates in China have national standards, and each blue license plate has seven printed characters, where each character has at least one corner, and the aspect ratio of the seven printed characters is about 4. ② The camera is installed at a fixed middle position on the folding arm of the road rescue equipment and horizontally faces the rear of the road rescue equipment. During the positive azimuth towing operation, the to-be-towed vehicle is located in the rear area of the road rescue equipment. The operation distance is generally 1 to 5 meters, and the selected focal length of the camera may be 4 to 8 millimeters. A size of the image collected by the camera in the present invention is 960×640, and within a range of the effective operation distance of 1 to 5 meters, the pixel size of the license plate character area in the collected image varies within a range of 300 to 5000.

(5) Towing Guidance

As shown in FIG. 4 in the specification, during the implementation of the positive azimuth towing operation, the road rescue equipment is generally located in front of the front of the to-be-towed vehicle, and the two are approximately arranged in a row. The vehicle-mounted camera is installed at a fixed middle position on the folding arm of the road rescue equipment, and horizontally faces the rear of the road rescue equipment. The central axis of the camera collection area is consistent with the central axis of the road rescue equipment and the towing device of the road rescue equipment, and a front license plate of the to-be-towed vehicle is generally located in the middle of the front of the to-be-towed vehicle, so that a relative position relationship between the road rescue equipment and the to-be-towed vehicle may be judged according to a left-right position relationship between a center of a picture outputted by the camera and a license plate center of the to-be-towed vehicle in the picture.

During the implementation of the positive azimuth towing operation, the driver faces the front of the road rescue equipment. Therefore, according to a position of the license plate center $(x_0, y_0)$ in the image determined during the license plate locating in step (4), referring to FIG. 11 in the specification, a direction prompt is given in real time to guide the driver to perform a reversing operation: if the license plate center of the to-be-towed vehicle in the image is on the left side of the center of the image, the driver is prompted to reverse to the right; and if the license plate center of the to-be-towed vehicle in the image is on the right side of the center of the image, the driver is prompted to reverse to the left, to implement alignment between bracket arms on two sides and two front wheels of the to-be-towed vehicle, and then fix the to-be-towed vehicle by locking tires and tow the to-be-towed vehicle away.

Through the foregoing steps, the method provided in the present invention can implement real-time guidance of the rescue equipment during the positive azimuth towing operation, thereby effectively improving the rescue efficiency of the road rescue equipment.

What is claimed is:

1. A positive azimuth towing guidance method for road rescue equipment based on license plate corner features, comprising the following steps:
   (1) collecting an image of an operation area behind a wrecker and preprocessing the image;
   (2) performing corner detection and preference on the preprocessed image;
   (3) clustering preferred corners;
   (4) locating a license plate according to the preferred corners and getting a license plate center; and
   (5) performing towing guidance according to the license plate center.

2. The positive azimuth towing guidance method for road rescue equipment based on license plate corner features according to claim 1, wherein in step (1), an image collection and preprocessing method is as follows: installing a vehicle-mounted camera on a folding arm at the rear of the road rescue equipment to collect the image of the operation area behind the wrecker, first converting the color collected image into a grayscale image, and then performing smooth filtering on the grayscale image.

3. The positive azimuth towing guidance method for road rescue equipment based on license plate corner features according to claim 2, wherein in step (2), the smoothed grayscale image is detected by using a Harris corner detection algorithm to obtain the corners in the image and all the obtained corners are stored into a corner set O; preference is performed on the corners obtained by using the Harris corner detection algorithm to obtain a preferred corner set A, and the method is as follows:
   (2.1) traversing all the corners in the corner set O in ascending order of horizontal and vertical coordinates of the corners, and saving, in a circular area that uses each corner as a center and that has a radius of 5 pixels, corners that have the largest corner strength in this area into the preferred corner set A; and
   (2.2) retaining, after the traversal ends, only one of the corners that are repeatedly saved and that have the same coordinates and corner strength in the preferred corner set A, and deleting redundant same corners from the preferred corner set A to finally obtain N different preferred corners.

4. The positive azimuth towing guidance method for road rescue equipment based on license plate corner features according to claim 1, wherein in step (3), a corner clustering method is as follows: performing agglomerative hierarchical clustering on the preferred corner set A according to distances between the corners to obtain I preselected corner sets B of license plate characters, i=1, 2, 3, . . . , I, i representing a sequence number of a preselected corner set, and the method being as follows:

(3.1) considering each corner $a_n$, n=1, 2, 3, . . . , N in the preferred corner set A as a class, there being only one corner in each class, calculating a class distance $D_{rg}$ between every two of all current classes, $D_{rg}$ representing the class distance between an $r^{th}$ class and a $g^{th}$ class, and defining the class distance $D_{rg}$ as an average value of a Euclidean distance between each corner in the $r^{th}$ class and each corner in the $g^{th}$ class, wherein since there is only one corner in each current class, that is, there is only a corner $a_r$ in the $r^{th}$ class, and there is only a corner $a_g$ in the class, a calculation formula of the class distance $D_{rg}$ is:

$$D_{rg} = d_{rg}$$

in this formula, $d_{rg}$ representing the Euclidean distance between corners $a_r$ and $a_g$, that is, $d_{rg} = \sqrt{(x_{a_r} - x_{a_g})^2 + (y_{a_r} - y_{a_g})^2}$, wherein $x_{a_r}$ and $y_{a_r}$ respectively represent horizontal and vertical coordinates of the corner $a_r$, and $x_{a_g}$ and $y_{a_g}$ respectively represent horizontal and vertical coordinates of the corner $a_g$; and according to the physical meaning of the class distance $D_{rg}$, $D_{rg} = D_{gr}$, and when r=g, $D_{rg} = 0$, all the class distances calculated above are expressed in a form of matrix, to obtain an initial N×N class distance matrix $$H = \begin{bmatrix} 0 & \cdots & D_{1N} \\ \vdots & \ddots & \vdots \\ D_{N1} & \cdots & 0 \end{bmatrix},$$

the element of row r and column g in the matrix H being $D_{rg}$;

(3.2) traversing the current Euclidean distance matrix H to find the minimum non-diagonal element in the matrix H, that is, the current smallest class distance being set as $D_{st}$, and s≠t, indicating that an $s^{th}$ class and a $t^{th}$ class are the current two closest classes, wherein if $D_{st} < D_{th}$, the corner in the $t^{th}$ class is incorporated into the $s^{th}$ class, then the $s^{th}$ class and the $t^{th}$ class are merged into a new class, and a total quantity of classes of corners after merging is recorded as V, to perform sub-step (3.3); otherwise, the clustering calculation is ended to obtain the I preselected corner sets $B_i$ of license plate characters, i=1, 2, 3, . . . , I, wherein i represents a sequence number of a preselected corner set; I represents the total quantity of preselected corner sets of the license plate characters, and I=V, wherein in the determination condition of this sub-step, $D_{st}$ is the minimum non-diagonal element in the current matrix H; and $D_{th}$ is a minimum class distance threshold; and (3.3) recalculating a class distance $D_{rg}$ between every two of current remaining classes and new classes obtained through merging, in this case, a calculation formula of the class distance $D_{rg}$ being:

$$D_{rg} = \frac{\sum_{j=1}^{M_r} \sum_{k=1}^{M_g} d_{jk}}{M_r \times M_g}$$

in the formula, $M_r$ representing the quantity of corners in the $r^{th}$ class, the corners in the class being represented as $p_j$, j=1, 2, 3, . . . , $M_r$; $M_g$ representing the quantity of corners in the $g^{th}$ class, the corners in the class being represented as $q_k$, k=1, 2, 3, . . . , $M_g$; and $d_{jk}$ representing a Euclidean distance between corners $p_j$ and $q_k$, that is $d_{jk}=\sqrt{(x_{p_j}-x_{q_k})^2+(y_{p_j}-y_{q_k})^2}$, wherein $x_{pj}$ and $y_{pj}$ respectively represent horizontal and vertical coordinates of the corner $p_j$, and $x_{qk}$ and $y_{qk}$ respectively represent horizontal and vertical coordinates of the corner $q_k$; and updating, by using the recalculated class distance, the class distance matrix H according to the class distance $D_{rg}$ and the physical meaning of the class distance matrix H, to obtain a new V×V class distance matrix $$H = \begin{bmatrix} 0 & \cdots & D_{1V} \\ \vdots & \ddots & \vdots \\ D_{V1} & \cdots & 0 \end{bmatrix},$$

and returning to sub-step (3.2).

5. The positive azimuth towing guidance method for road rescue equipment based on license plate corner features according to claim 4, wherein in step (4), a license plate locating method is as follows: for the preselected corner set $B_i$ of the license plate characters obtained by clustering in step (3), i=1, 2, 3, . . . , I, sorting out an effective corner set C of the license plate characters from the preselected corner set $B_i$ of the license plate characters, and then determining a license plate position, the method being as follows:

(4.1) initializing i=1;

(4.2) if the preselected corner set $B_i$ of the license plate characters satisfies that $num_{B_i}>num^{th}$, performing sub-step (4.3); otherwise, performing sub-step (4.5), wherein in the determination condition of this sub-step, $num_{B_i}$ is the quantity of corners in the corner set $B_i$ of the license plate characters; and $num_{th}$ is a threshold of the quantity of corners in the corner set of the license plate characters;

(4.3) traversing the preselected corner set $B_i$ of the license plate characters to determine a maximum horizontal coordinate $\overline{x}_{B_i}$, a minimum horizontal coordinate $\underline{x}_{B_i}$, a maximum vertical coordinate $\overline{y}_{B_i}$, and a minimum vertical coordinate $\underline{y}_{B_i}$ of corners in the set, and define a center $(x_{B_i}, y_{B_i})$, a length $l_{B_i}$, and a width $w_{B_i}$ of a minimum enclosing rectangle of the corner set, that is, $x_{B_i}=\frac{1}{2}(\underline{x}_{B_i}+\overline{x}_{B_i})$, $y_{B_i}=\frac{1}{2}(\underline{y}_{B_i}+\overline{y}_{B_i})$, $l_{B_i}=\overline{x}_{B_i}-\underline{x}_{B_i}$, and $w_{B_i}=\overline{y}_{B_i}-\underline{y}_{B_i}$, and then calculating an aspect ratio $\beta_{B_i}$ and an area $\gamma_{B_i}$ of the minimum enclosing rectangle of the preselected corner set $B_i$ of the license plate characters, that is, and $\beta_{B_i}=l_{B_i}/w_{B_i}$ and $\gamma_{B_i}=l_{B_i}\times w_{B_i}$, if $\beta_{B_i}>\beta_{min}$ and $\beta_{B_i}<\beta_{max}$, the sub-step (4.4) being performed; otherwise, the sub-step (4.5) being performed, wherein in the determination condition of this sub-step, $\beta_{B_i}$ represents the aspect ratio of the minimum enclosing rectangle of the preselected corner set $B_i$ of the license plate characters; $\beta_{min}$ represents a low threshold of the aspect ratio of the minimum enclosing rectangle of the preselected corner set $B_i$ of the license plate characters; and $\beta_{max}$ represents a high threshold of the aspect ratio of the minimum enclosing rectangle of the preselected corner set $B_i$ of the license plate characters;

(4.4) if the preselected corner set $B_i$ of the license plate characters satisfies that $\gamma_{B_i}>\gamma_{min}$ and $\gamma_{B_i}<\gamma_{max}$, determining the corner set $B_i$ as the effective corner set C of the license plate characters, and determining a license plate center $(x_0, y_0)$, a length $l_0$, and a width $w_0$, that is, $x_0=x_{B_i}$, $y_0=y_{B_i}$, $l_0=l_{B_i}$, and $w_0=w_{B_i}$, ending the license plate locating process, and performing (5) to implement the towing guidance; otherwise, performing sub-step (4.5), wherein in the determination condition of this sub-step, $\gamma_{B_i}$ represents an area of the minimum enclosing rectangle of the preselected corner set $B_i$ of the license plate characters; $\gamma_{min}$ represents a low threshold of the area of the minimum enclosing rectangle of the preselected corner set $B_i$ of the license plate characters; and $\gamma_{max}$ represents a high threshold of the area of the minimum enclosing rectangle of the preselected corner set $B_i$ of the license plate characters; and (4.5) if i<I, increasing the value of i by 1, and returning to sub-step (4.2); otherwise ending the license plate locating process, and returning to image collection and preprocessing in step (1).

6. The positive azimuth towing guidance method for road rescue equipment based on license plate corner features according to claim 5, wherein in step (5), the towing guidance method is implemented as follows: giving, according to a position of the license plate center $(x_0, y_0)$ in the image determined during the license plate locating in step (4), a direction prompt in real time to guide the driver to perform a reversing operation: if the license plate center of the to-be-towed vehicle in the image is on the left side of the center of the image, the driver is prompted to reverse to the right; and if the license plate center of the to-be-towed vehicle in the image is on the right side of the center of the image, the driver is prompted to reverse to the left, to implement alignment between bracket arms on two sides and two front wheels of the to-be-towed vehicle, and then fix the to-be-towed vehicle by locking tires and tow the to-be-towed vehicle away.

* * * * *